United States Patent [19]

Mahone

[11] Patent Number: 4,772,516
[45] Date of Patent: Sep. 20, 1988

[54] STABLE METHYLPOLYDISILYLAZANE POLYMERS

[76] Inventor: Louis G. Mahone, 3611 Dartmouth, Midland, Mich. 48640

[21] Appl. No.: 118,269

[22] Filed: Nov. 9, 1987

[51] Int. Cl.[4] .......................... B05D 3/02; B32B 9/04; C01B 31/36
[52] U.S. Cl. .................... 428/447; 264/29.1; 423/345; 427/228; 427/387; 521/154; 521/919; 528/31; 528/32; 528/33; 528/36; 528/38; 428/408
[58] Field of Search ...................... 264/29.1; 423/345; 427/228, 387; 428/447, 408; 521/154, 919; 528/31, 32, 33, 36, 38

[56] References Cited

U.S. PATENT DOCUMENTS

| 2,579,417 | 12/1951 | Cheronis | 260/2 |
|---|---|---|---|
| 2,579,418 | 12/1951 | Cheronis | 260/2 |
| 2,624,721 | 1/1953 | Hatcher et al. | 260/46.5 |
| 2,970,969 | 2/1961 | Schultz et al. | 260/2 |
| 3,939,195 | 2/1976 | Lücking et al. | 260/448.2 |
| 4,267,211 | 5/1981 | Yajima et al. | 427/228 |
| 4,312,970 | 1/1982 | Gaul, Jr. | 526/279 |
| 4,314,956 | 2/1982 | Baney et al. | 427/387 X |
| 4,340,619 | 7/1982 | Gaul | 427/387 X |
| 4,404,153 | 9/1983 | Gaul, Jr. | 264/29.2 |
| 4,482,669 | 11/1984 | Seyferth et al. | 524/442 |
| 4,482,689 | 11/1984 | Haluska | 528/25 |

OTHER PUBLICATIONS

Andrianov, et al., "Synthesis of N-trimethylsilyl-substituted organoaminosilanes and cyclodisilazanes", *Chemical Abstracts*, 84:59646c (1976).
Andrianov, et al., "Coammonolysis of Silicon Tetrachloride with Trimethylchlorosilane", *Chemical Abstracts*, 86:140127x (1977).
Arai, et al., "Poly(organohydrosilazanes)", *Chemical Abstracts*, 105:191849c (1986).
Buziashvili, et al., "Organosilazanes with Phenylethyl Radicals at the Silicon Atom and Their Hydrolytic Stability", *Chemical Abstracts*, 103:23005q (1985).
Christophliemk, et al., "Condensable Film-forming Organosilazanes", *Chemical Abstracts*, 92:182666b (1980).
Gorislavskaya, et al., "Ammonolysis of Organochlorosilanes Containing 3,3,3-trifluoropropyl and Phenyl Radicals at the Silicon Atom, their Co-ammonolysis with Trimethylchlorosilane and Isomers of Diorganocyclosilazanes", *Chem. Ab.*, 78:58514x, '73.
Kalinin, et al., "Ammonolysis of (Carboranylmethyl) Organochlorosilanes and their Coammonolysis with Trimethylchlorosilane", *Chemical Abstracts*, 95:150731q (1981).
Larionova, et al., "Synthesis and Properties of Silazanes with Trifluoromethylphenyl Substituents at the Silicon Atom", *Chemical Abstracts*, 97:127699t (1982).
Lebedev, et al., "Reaction of Hexamethyldisilazanes with Diorganodichlorosilanes", *Chemical Abstracts*, 82:31375y (1975).
Lebedev, et al., "Reaction of Hexamethyldisilazane with Phenyltrichlorosilane", *Chemical Abstracts*, 87:85076y (1977).
Mooser, et al., "Transsilylation on Disilazanes", *Chemical Abstracts*, 81:63714d (1974).
Morgunova, et al., "Coammonolysis of 1,3-bis(dimethylchlorosilyl)-2,2,4,4-Tetramethylcyclodisilazane with Dimethyldichlorosilane", *Chemical Abstracts*, 97:216294z (1982).
Seyfert, et al., "Silicon-Nitrogen Polymers and Ceramics Derived from Reactions of Dichlorosilane", *Chemical Abstracts*, 102:189589n (1984).
Vlasova, et al., "Ammonolysis of B,B-Dichloroalkylsilylethyl Vinyl Ethers", *Chemical Abstracts*, 79:115677z (1973).
Yajima, et al., "Organosilicon Polymers Containing Atoms Other Than Silicon, Carbon, Hydrogen and Oxygen", *Chemical Abstracts*, 87:185965f (1977).
Zhinkin, et al., "Methyl(y-trifluoropropyl)cyclosilazanes", *Chemical Abstracts*, 79:18846w (1973).
Zhinkin, et al., "Organosilicon Composition", (ammonolysis of a Mixture of $Me_2SiCl_2$ and $MeSiCl_3$), *Chemical Abstracts*, 82:44304z (1975).
Zhinkin, et al., "Poly(organosilazane)Adhesive", *Chemical Abstracts*, 84:60493g (1976).
Zhinkin, et al., "Poly(organosiloxysilazanes)", *Chemical Abstracts*, 86:90921d (1977).

*Primary Examiner*—Michael R. Lusignan
*Attorney, Agent, or Firm*—Marshall, O'Toole, Gerstein, Murray & Bicknell

[57] ABSTRACT

A method for producing methylpolydisilylazane polymers of reduced chloride content that exhibit no increase in pyrophoricity and exhibit improved shelf life. The methylpolydisilylazane polymers of reduced chloride content are useful in the production of silicon nitride and silicon carbide containing fibers and the like.

24 Claims, No Drawings

STABLE METHYLPOLYDISILYLAZANE POLYMERS

STATEMENT OF GOVERNMENT RIGHTS

The United States Government has rights in this invention pursuant to Contract Number F33615-85-C-5006 awarded by the United States Air Force.

FIELD OF THE INVENTION

This invention relates to a process of producing improved methylpolydisilylazane polymers. More particularly it relates to a process of producing methylpolydisilylazane polymers of reduced chloride content which exhibit increased stability and suitability for use in high strength ceramic articles compared to the same polymer prior to chloride content reduction.

BACKGROUND OF THE INVENTION

The synthesis of methylpolydisilylazane is known in the art. See Gaul U.S. Pat. No. 4,340,619. Methylpolydisilylazane finds utility in the production of silicon nitride and silicon carbide containing ceramic fibers and the like. Methylpolydisilylazane is typically prepared by the reaction of a mixture of methylchlorodisilanes and hexamethyldisilazane to form trimethylchlorosilane and a partially trichloromethylsilylamino-endblocked methylpolydisilazane which contains unreacted chloride. The unreacted chloride content ranges from 3 to 6 weight percent. That chloride content is in the form of about 90 weight percent silicon-bonded chloride and about 10 weight percent ammonium chloride as determined by infrared spectrophotometry.

The residual chloride content is a major factor in decreasing the suitability of the methylpolydisilylazane polymer for use in the production of high strength ceramic fibers. Silicon-bonded chloride reacts with atmospheric moisture to produce unstable Si-OH bonds. Such moisture-exposed polymers exhibit poor stability during subsequent storage and melt spinning (a procedure employed in producing ceramic fibers from the polymer). The increased oxygen content adversely affects the elastic modulus of the ceramic fiber. The presence of ammonium chloride solid produces flaws in the ceramic fiber which can adversely affect the tensile strength of the fiber.

The patent literature discloses the preparation of amine and ammonia derivatives of methylpolysilanes (MPS) with somewhat reduced chloride content. Baney, et al., U.S. Pat. No. 4,314,956 discloses the synthesis of amine derivatives of methylpolysilanes via the aminolysis of the corresponding chlorine substituted methylpolysilanes. The methylpolysilanes are low molecular weight polymers having continuous silicon atoms along the backbone of the polymer. Chlorine substituted methylpolysilane polymers contain $CH_3Si\equiv$ units and $(CH_3)_2Si=$ units wherein the valence sites which are not filled by bonds to other silicon atoms are satisfied by bonds to chlorine. Baney, et al. teaches a process for reacting the chlorine substituted methylpolysilane polymer with an aminolysis reagent of the formula $NHR_2$ wherein R is hydrogen, an alkyl group, or phenyl. The Baney, et al. process is described as effecting the substitution of $-NR_2$ for at least a portion of the chlorine atoms in the methylpolysilane polymer.

The methylpolydisilylazane (MPDZ) polymer of this invention has two silicon atoms alternating with a nitrogen atom along the backbone of the polymer chain. Methylpolydisilylazane polymers typically contain 3 to 5% by weight of chlorine substituents but also may be crosslinked or branched by additional nitrogen atoms bonded to silicon atoms along the backbone chain. Ammonia derivatives of methylpolysilanes prepared by the process described in Baney, et al. are pyrophoric while the ammonia derivatives of methylpolydisilylazanes of this invention are not pyrophoric.

SUMMARY OF THE INVENTION

The present invention comprises a method of producing methylpolydisilylazane polymers of reduced chloride content that exhibit no increase in pyrophoricity, have improved shelf life (i.e., hydrolytic) stability, and which result in ceramic fibers and the like which exhibit increased tensile strength and elastic modulus following pyrolysis.

More specifically, pursuant to the method of the present invention, about 15 weight percent to about 80 weight percent methylpolydisilylazane polymer is dissolved in an organic solvent. The dissolved polymer is then treated with ammonia under pressure for about 1 to about 20 hours. The treated methylpolydisilylazane polymer is then recovered.

Also included in this invention is a new and novel composition of matter consisting essentially of a methylpolydisilylazane polymer of reduced chloride content represented by the general formula:

$$(Me_3SiNH)_{6-x-2y}Me_xSi_2(NH)_y$$

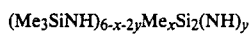

wherein the average value of x varies from 1 to 4, y varies from 1 to 2.5, the value of $x+2y$ varies from 3 to 6, and the average chloride content of said polymer is less than 0.5 weight percent, and which exhibits no increase in pyrophoricity compared to said polymer prior to chloride reduction by ammonolysis.

This invention further comprises a method of preparing a silicon nitride/silicon carbide containing ceramic material of improved tensile strength, by heating a methylpolydisilylazane polymer of reduced chlorine content in an inert atmosphere, or in a vacuum, to a temperature of at least 750° C., until the methylpolydisilylazane polymer is converted to a silicon nitride/silicon carbide containing ceramic material.

A further aspect of the invention is a method of preparing a filled ceramic article which comprises (A) mixing a methylpolydisilylazane polymer of reduced chlorine content with at least one conventional ceramic filler; (B) forming an article of the desired shape from the mixture of methylpolydisilylazane polymer and filler; and, (C) heating the formed article in an inert atmosphere or in a vacuum at an elevated temperature of at least 750° C. until a silicon nitride/silicon carbide containing ceramic is formed.

An additional aspect of the invention is a method of preparing an article coated with unfilled ceramic material which method comprises: (A) coating a substrate with a methylpolydisilylazane polymer of reduced chloride content; (B) heating the coated substrate in an inert atmosphere or in a vacuum at an elevated temperature of at least 750° C. until the coating is converted to a silicon nitride/silicon carbide containing ceramic material, whereby a silicon nitride/silicon carbide containing ceramic coated article is obtained.

Also contemplated within the scope of the present invention are embodiments wherein the methylpolydisilylazane polymer is modified by incorporating some functional organic groups (for example, methylvinyl dichlorosilane and/or phenylvinyl dichlorosilane) to modify the final polymer rheology and cure.

Other features and advantages are inherent in the method and articles claimed and disclosed or will become apparent to those skilled in the art from the following detailed description.

DETAILED DESCRIPTION

In practicing the invention, solutions of methylpolydisilylazane polymer can be formed by dissolving the polymer in a suitable solvent, stirring the polymer and solvent under an inert and essentially dry atmosphere. The concentration of polymer in the solvent can vary between about 15 weight percent to about 80 weight percent. Low polymer concentrations facilitate separation of by-product ammonium chloride but require a more extensive distillation to isolate the polymer after treatment with ammonia. High polymer concentrations result in increased viscosity of the polymer solution which can impede mixing. A preferred concentration is 25 weight percent to 35 weight percent polymer.

Any organic solvent which dissolves the methylpolydisilylazane polymer and does not react with either the polymer or ammonia may be used. Useful solvents, for example, include ethers such as diethyl ether, tetrahydrofuran, dioxane, and hydrocarbons such as benzene, toluene, heptane, cyclohexane and xylene. In general, any known organic solvents which function to facilitate the treatment of the methylpolydisilylazane polymer with ammonia can be employed. It is preferred to use solvents with boiling points below 150° C. to facilitate removal of the solvent from the polymer after the ammonia treatment process.

The pressure under which the ammonolysis takes place can vary from about 0 PSIG to about 100 PSIG with 90 PSIG being the preferred pressure. The ammonia may be in either the liquid or the gas phase. The temperature under which the ammonolysis takes place can vary from about −50° C. to about 150° C. The preferred temperature is from room temperature to about 50° C. By controlling the addition of ammonia one may control the pressure of the reaction. By controlling the pressure and temperature of the reaction, one may control the physical state of the by-produced ammonium chloride salt. More particularly, at a pressure above the saturation pressure of ammonia the salt will be in a separate liquid phase, while at a pressure below the saturation pressure, the salt will be solid.

The time of contact for the ammonolysis may be from about 20 minutes to more than 24 hours. The rate of reaction can be increased by increasing the concentration of ammonia in the methylpolydisilylazane polymer solution. One may increase the concentration of ammonia in the polymer solution by operating at a pressure near the saturation pressure.

The methylpolydisilylazane polymer may be recovered by separating the polymer solution from the ammonium chloride by filtration or phase separation, as appropriate, and distilling the solvent. The distillation is preferably carried out to about 240° C. and about 10 torr to ensure removal of solvent.

The methylpolydisilylazane polymer may additionally incorporate suitable chloromonosilanes substituted with functional or nonfunctional organic groups. These monosilanes may be incorporated into the polymer backbone by using a mixture of methylchlorodisilanes and chloromonosilanes during synthesis. The mole ratio of monosilanes to disilanes in the reaction mixture is typically in the range 0 to 0.3. Examples of functional and nonfunctional chloromonosilanes which can be employed are phenylvinyl dichlorosilane, methylvinyl dichlorosilane, vinyl trichlorosilane, methyl trichlorosilane, and phenylmethyl dichlorosilane. The preparation of such modified methylpolydisilylazane polymers is more fully described in U.S. Pat. No. 4,312,970, which is hereby incorporated by reference. The modified methylpolydisilylazanes in some instances contain functional organic groups which provide sites for crosslinking and control of rheology and in other instances contain organic groups which are incorporated to control ratios of carbon to silicon in the polymer.

The polymers produced by this invention are useful for the formation of silicon nitride/silicon carbide containing ceramic materials by a process wherein the ammonia-substituted methylpolydisilylazane polymer is heated in an inert atmosphere or in a vacuum to at least a temperature of 750° C. until the polymer is converted to a silicon nitride/silicon carbide containing ceramic.

Further, the polymers produced by this invention are useful for the formation of silicon carbide/silicon nitride containing ceramic articles by a process comprising the steps of: (A) forming an article of the desired shape from the methylpolydisilylazane polymer of reduced chloride content; (B) heating the article formed in (A) in an inert atmosphere or in a vacuum to a temperature of at least 750° C., until the methylpolydisilylazane polymer is converted to a silicon nitride/silicon carbide containing ceramic.

In another application, the polymers produced by this invention are useful for the formation of silicon nitride/silicon carbide filled ceramic articles by a process comprising the steps of: (A) mixing the methylpolydisilylazane polymer of reduced chloride content with at least one conventional ceramic filler; (B) forming an article of the desired shape from the mixture of methylpolydisilylazane polymer and filler; and, (C) heating the article formed in (B) in an inert atmosphere or in a vacuum to a temperature of at least 750° C., until a silicon nitride/silicon carbide containing ceramic article is formed.

The polymers produced by this invention are also useful for the formation of heat or chemical resistant articles having a coating of silicon nitride/silicon carbide by a process comprising the steps of: (A) mixing a methylpolydisilylazane polymer of reduced chloride content with at least one conventional ceramic filler; (B) coating a substrate with the mixture of methylpolydisilylazane polymer and filler; and, (C) heating the article formed in (B) in an inert atmosphere or in a vacuum to a temperature of at least 750° C., until the disilazane polymer in the coating mixture is converted to a silicon nitride/silicon carbide containing ceramic.

The polymers produced by this invention are useful for the formation of heat-resistant and chemical-resistant articles which are coated with a silicon nitride/silicon carbide containing ceramic by a process comprising the steps of: (A) coating a substrate with a methylpolydisilylazane polymer of reduced chloride content; and, (B) heating the article formed in (A) in an inert atmosphere or in a vacuum to a temperature of at least 750° C., until the methylpolydisilylazane polymer in the coating is converted to a silicon nitride/silicon carbide containing ceramic.

GENERAL EXPERIMENTAL PROCEDURE

Methylpolydisilylazane polymers were synthesized by mixing methylchlorodisilanes with sufficient hexamethyldisilazane such that there was about 0.8 moles of hexamethyldisilazane per gram atom of chlorine. Chlorosilanes or silanes containing organic functional groups such as vinyl may also be added to the mixture. The mixture was placed in a stripping flask fitted with a condenser and heated while stirring using the following heating and cooling steps: (1) from 25° C. to 80° C. the mixture was heated at a rate of 2.5° C. per minute, then held at 80° C. for about 20 minutes; (2) from 80° C. to 220° C. the mixture was heated at a rate of 1° C. per minute, then held at 220° C. for 20 minutes; and, (3) the mixture was then cooled to room temperature.

The starting chloride content of the methylpolydisilylazane polymers made utilizing this synthesis technique was about 3 weight percent to about 6 weight percent. When the starting chloride is not reported for the various illustrative examples described below, it should be presumed that the example's starting chloride was within this range. The weight percent chloride was determined by using a sodium peroxide fusion followed by a potentiometric titration with silver nitrate.

Silicon, nitrogen, carbon, hydrogen and oxygen concentrations were determined as follows:

Silicon was determined by using a sodium peroxide fusion to form soluble silicon, followed by quantitation by Atomic Absorption Spectroscopy (AA) or Inductively Coupled Plasma (ICP).

Carbon, hydrogen and nitrogen were determined by Gas Liquid Chromatography (GLC) of oxidation products following combustion at about 1000° C. using tin as a promotor.

Oxygen was determined using the Leco method wherein the samples were heated to about 2500° C. with excess carbon and the evolved carbon monoxide analyzed by Infrared Spectrophotometry (IR).

The glass transition temperature (Tg) and the penetration onset temperature (Ts) were determined via Thermomechanical Analysis (TMA) on a DuPont Thermal Analyzer. The Tg is typically 10° C. higher than the corresponding Ts.

The number average molecular weight (Mn) and the weight average molecular weight (Mw) were determined using Gel Permeation Chromatography (GPC) on polystyrene gel columns.

EXAMPLES 1-5

The methylpolydisilylazane polymer used in Examples 1-5 were prepared utilizing the above-described synthesis technique. The methylpolydisilylazane polymers were analyzed and their starting weight percent chlorine concentration, Mn, Mw and Ts were determined. For Example 1, twenty grams (20 g) of a methylpolydisilylazane polymer was dissolved in sixty grams (60 g) of ether and then added to a slurry of NaNH$_2$(57 mM) in 150 ml of liquid ammonia at −30° C. and 1 atmosphere of pressure. The solution was refluxed for four hours, treated with 3.07 grams NH$_4$Cl and allowed to evaporate overnight. The ether solution was then separated from the NH$_4$Cl solid and stripped.

For Examples 2 through 5, methylpolydisilylazane polymer was dissolved in ether or ether/toluene solvent and combined with liquid ammonia. The mixture was stirred while the ammonia evaporated overnight. The polymer solution was then removed and stripped to recover the polymer. The methylpolydisilylazane polymer employed in Examples 4 and 5 incorporated phenylvinyl silicon units in the polymer backbone.

Following completion of the ammonolysis, weight percent chloride, Mn, Mw and Ts were determined. Where no data is reported, no analysis was made. The results are contained in Table I.

TABLE I

| Example | Reactant Polymer (g) | Amounts Ether (g) | NH$_3$(l) (ml) | Before Ammonolysis wt. % Cl | Mn | Mw | Ts | After Ammonolysis wt. % Cl | Mn | Mw | Ts | Note |
|---|---|---|---|---|---|---|---|---|---|---|---|---|
| 1 | 20 | 60 | 150 | 5.6 | 1143 | 1892 | 91 | 0.33 | 1121 | 1991 |  | A |
| 2 | 21.5 | 67 | 168 | 4.7 | 1102 | 1961 |  | 0.1 |  |  |  | B |
| 3 | 257 | 300 | 200 | 3.7 |  |  | 98 | 0.05 |  |  |  | C |
| 4 | 286 | 331 | 250 |  |  |  | 98 | 0.04 | 1237 | 3941 | 100 |  |
| 5 | 493 | 600 | 200 |  |  |  |  | 0.23 | 994 | 2986 | 90 | DE |
|  |  |  |  |  |  |  |  | 0.05 |  |  | 94 | E |

A. NaNH$_2$ was present before ammonolysis
B. After ammonolysis, solid salt was water soluble and was 98% of theoretical weight of NH$_4$Cl
C. Only solvents were observed in distillate resulting from stripping operation
D. End product wt. % Oxygen: 0.33, 0.38; No NH$_4^+$ ion in end product
E. Toluene (100 g) included in reaction mixture; added before ammonia The results show a 10 fold decrease in chlorine concentration without any resulting instability of the methylpolydisilylazane polymers. It is believed that the ammonia serves as an acid acceptor in a solvolysis reaction, i.e. the ammonia molecule behaves similar to water in that its relatively small molecular size allows it to react with the less accessible chlorines. It is believed that the immediate product of ammonolysis is a silyl amine containing active hydrogen. Although a silyl amine could be expected to act similarly to silanols, undergoing subsequent condensation to cross-link the polymer and build molecular weight, surprisingly, there was no significant increase in molecular weight following ammonolysis.

The hydrolytic stability of the methylpolydisilylazane polymers with reduced chlorine content in accordance with the present invention was compared to methylpolydisilylazane polymer with high chlorine content. A portion of the methylpolydisilylazane polymer of Example 3, before and after ammonolysis, was divided into an appropriate number of samples and subjected to argon, air, dry air and ammonia atmospheres at 25° C., 70° C. and 100° C. Visual observations were made to determine the degree of gelling and clarity of the various samples. Where no data is reported, no analysis was made. The results are contained in Table II.

TABLE II

| Wt. % Cl | 3.7 | 0.04 | 3.7 | 0.04 | 3.7 | 0.04 |
|---|---|---|---|---|---|---|
| TEMPERATURE: | 25° C. | 25° C. | 70° C. | 70° C. | 100° C. | 100° C. |

TABLE II-continued

| ATMOSPHERE: | | | | | | |
|---|---|---|---|---|---|---|
| Argon | | | | | 4C | 2C |
| Dry Air | | | 1H | 0C | 4C | 2C |
| Air | 1H | 0C | | | | |
| | 1H | 0C | 2H | 0C | 4C | 2C |
| Ammonia | 2H | 0C | 3H | 0C | | |

Gel Key:
0 none
1 trace
2 average
3 much
4 gross
Solution Key:
C clear
H hazy

It was found that the high chloride, methylpolydisilylazane polymers gelled readily in the presence of air or ammonia, and this is indicative of the fact that these polymers degrade rapidly in storage due to contact with trace moisture in their normal handling. In contrast, the low chloride methylpolydisilylazane polymers of the present invention only gelled at elevated temperatures. It is believed that because the methylpolydisilylazane polymers of the present invention did not gel at the lower temperatures they will exhibit enhanced stability following normal handling.

EXAMPLES 6-9

The methylpolydisilylazane polymers of Examples 6-9 were subjected to ammonolysis using the following procedure.

A 2.4 liter metal cylinder, fitted with a 200 PSIG relief valve and pressure gauge, was evacuated, loaded with polymer dissolved in heptane solvent, and pressurized with gaseous ammonia to about 90 PSIG. The weight gain and pressure were recorded after mixing. Samples were taken at intervals, centrifuged to remove $NH_4Cl$, and total chlorides were determined. The cylinder was then filled with additional ammonia in liquid form, and further samples were taken to determine total chloride content.

The ammonolysis procedure was carried out using a mixture of high chloride methylpolydisilylazane and dry heptane or toluene. The resulting solution was pressurized to about 90 PSIG with sufficient ammonia liquid. The reactor was allowed to stand overnight and then drained. The $NH_4Cl$ resulting from the reaction described above may be in a solid or liquid phase depending on the concentration of ammonia employed in the reaction. The polymer solution was filtered to remove solids and stripped to remove solvent. No evidence of $NH_4Cl$ was found during stripping.

The concentration of the MPDZ polymer, liquid ammonia and gaseous ammonia used in the ammonolysis procedure were varied to determine if there would be any affect on the rate of ammonolysis. Where no data is reported, no analysis was made. The results are contained in Table III.

TABLE III

| | Ex. #6 | Ex. #7 | Ex. #8 | Ex. #9 |
|---|---|---|---|---|
| MPDZ-Cl gm | 183 | 150 | 160 | 240 |
| Heptane gm | 747 | 820 | 690 | 730 |
| $NH_3$ (solution) gm | 31 | 33 | — | 47 |
| Additional $NH_3$ (liquid) gm | 70 | 30 | 50 | 30 |
| wt. % Cl content v. Time | | | | |

TABLE III-continued

| | Ex. #6 | Ex. #7 | Ex. #8 | Ex. #9 |
|---|---|---|---|---|
| 0 hr | 4.1 | 4.1 | 4.1 | 4.1 |
| 1 hr | 0.4 | 0.3 | — | 0.6 |
| 2 hr | 0.7 | 0.6 | — | — |
| 16 hr | 0.5 | | | |
| wt. % Cl content v. time after Additional $NH_3$ (liquid) added: | | | | |
| 1 hr | 0.4 | 0.3 | 0.5 | 0.4 |
| 2 hr | 0.8 | 0.2 | 0.8 | 0.4 |
| GPC: | | | | |
| Mn | 855 | 879 | 902 | 817 |
| Mw | 1884 | 2107 | 2060 | 1405 |

The results show that ammonolysis is essentially complete after about an hour for all concentrations of methylpolydisilylazane polymer, liquid ammonia and gaseous ammonia. Chlorine concentrations were reduced 10 fold and considerable $NH_4Cl$ was produced. The nature of the salt phase (i.e. $NH_4Cl$) can be controlled by pressure such that it will be a solid, $NH_4Cl$, at lower pressures or a separate liquid phase, $NH_3$-$NH_4Cl$, at higher pressures obtained by use of additional ammonia. The salt phase reduces total pressure which can be raised by the addition of sufficient ammonia. Thus the concentration and density of the salt phase may be controlled by ammonia addition. When the salt phase is sufficiently dense it may be withdrawn from the bottom of the reactor.

EXAMPLES 10-13

A comparison was made between: (a) methylpolydisilylazane polymers with high chloride content, incorporating a phenylvinyl dichlorosilane (Examples 10 and 12); and (b) methylpolydisilylazane polymers of the present invention, incorporating phenylvinyl dichlorosilane (Examples 11 and 13), the latter polymers having been treated with the ammonolysis technique of the present invention in accordance with the procedure illustrated in Examples 6-9. A thermal treatment or strip was employed to enhance the glass transition temperature (Tg) of the resultant polymers. The weight percent of Cl, Si, C, H, N and O and the Ts, Mn and Mw were determined. The results are contained in Table IV.

TABLE IV

| Treatment: | Ex. 10 | Ex. 11 | Ex. 12 | Ex. 13 |
|---|---|---|---|---|
| 1. Thermal strip | NO | NO | YES | YES |
| 2. Ammonolysis | NO | YES | NO | YES |
| 3. Filtration | YES | YES | YES | YES |
| 4. Solvent strip | YES | YES | YES | YES |
| 5. Wt. % | | | | |
| Cl | 3.5 | 0.13 | 3.6 | 0.08 |
| Si | 41.1 | 41.7 | 41.4 | 41.9 |
| C | 34.2 | 34.8 | 33.6 | 34.1 |
| H | 7.9 | 7.8 | 7.9 | 8.2 |
| N | 12.8 | 15.8 | 13.4 | 15.4 |
| O | 1.8 | 0.6 | 1.3 | 0.5 |
| 6. Ts (°C.) | 116 | 116 | 146 | 156 |
| 7. Mn | 869 | 1069 | 1033 | 977 |
| 8. Mw | 2078 | 3545 | 3913 | 3613 |

The results indicate that by utilizing the method of the present invention together with a thermal treatment or strip, methylpolydisilylazane polymers with low chloride content and incorporating a phenylvinyl silicon may be used to prepare a polymer with a higher glass transition temperature. The ammonolysis did not significantly alter molecular weight or Tg compared to the high chloride polymer. The use of a thermal treatment step can be expected to enhance thermal stability of the final polymer.

EXAMPLES 14–22

A number of polymers were made in accordance with the present invention using various methylpolydisilylazane-Cl polymers (M) and methylpolydisilylazane-Cl polymers modified with functional organic groups (i.e. methylvinyl dichlorosilane (MeVi), and phenylvinyl dichlorosilane (PhVi)). All of the polymers were treated employing the method of ammonolysis utilized for examples 6–9. The weight percent Cl and the Tg, Mn and Mw were determined for each polymer. Where no data is reported, no analysis was made. The results are contained in Table V.

TABLE V

| Example | Before Ammonolysis | | After Ammonolysis | | | |
|---|---|---|---|---|---|---|
| | Wt. % Cl | Tg | Wt. % Cl | Tg | Mn | Mw |
| 14 PhVi | | 152 | 0.29 | 129 | 862 | 2232 |
| 15 PhVi | | 108 | 0.06 | 95 | 1291 | 6656 |
| 16 PhVi | | 108 | 0.06 | 124 | 1216 | 3756 |
| 17 M | | | 0.01 | 169 | 1575 | 6767 |
| 18 M | | | 0.14 | 77 | 1039 | 2148 |
| 19 MeVi | | | 0.11 | 127 | 1503 | 4777 |
| 20 MeVi | | | 0.05 | 102 | 1248 | 2815 |
| 21 M | | | 0.01 | 158 | 1159 | 3212 |
| 22 M | 2.8 | | 0.02 | 96 | 1019 | 2047 |

The results indicate the polymer Tg was not significantly changed by the ammonolysis of the present invention. The chloride concentration of the resulting polymers (end product) was reduced below 0.3 weight percent and usually below 0.1 weight percent.

What is claimed is:

1. A method of preparing a stable methylpolydisilylazane polymer with reduced chloride content and without increased pyrophoricity, which method comprises the steps of:
   (a) dissolving about 15 weight percent to about 80 weight percent solids of said polymer in an organic solvent;
   (b) contacting the dissolved polymer with ammonia;
   (c) reacting the dissolved polymer with said ammonia for about 1 to about 20 hours; and
   (d) recovering the reacted polymer.

2. A method as recited in claim 1 wherein said ammonia is in the gaseous phase.

3. A method as recited in claim 1 wherein said ammonia is in the liquid phase.

4. A method as recited in claim 2 wherein:
   said reacting step is conducted at a temperature in the range of about −34° C. to about 70° C.

5. A method as recited in claim 1 wherein:
   said reacting step is conducted at a temperature above the boiling point of ammonia.

6. A method as recited in claim 5 wherein:
   said reacting step is conducted under pressure up to about 100 PSIG.

7. A method as recited in claim 1 wherein:
   the chloride content of said methylpolydisilylazane polymer before said contacting step is substantially greater than 0.5 weight percent; and
   the chloride content of said methylpolydisilylazane polymer is reduced to less than 0.5 weight percent by said reacting step.

8. A method as recited in claim 1 wherein:
   said organic solvent is at least one of diethylether, toluene and heptane.

9. A method as recited in claim 1 wherein:
   salt is produced as a by-product of said contacting and reacting steps; and
   said contacting step comprises introducing sufficient ammonia so that the salt by-product is in a liquid phase.

10. A method as recited in claim 1 wherein:
    salt is produced as a by-product of said contacting and reacting steps; and
    said contacting step comprises introducing sufficient ammonia so that the salt by-product is in a solid phase.

11. A composition of matter consisting essentially of:
    a methylpolydisilylazane polymer of reduced chloride content represented by the general formula:

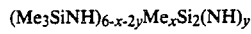

$(Me_3SiNH)_{6-x-2y}Me_xSi_2(NH)_y$ wherein the average value of x varies from 1 to 4, the average value of y varies from 1 to 2.5, and the average value of x+2y varies from 3 to 6;
    the average chloride content of said polymer being less than 0.5 weight percent;
    said polymer exhibiting no increase in pyrophoricity, as a result of having its chloride content reduced to less than 0.5 weight percent by ammonolysis, compared to the same polymer with greater chloride content prior to chloride reduction by ammonolysis.

12. A method of preparing ceramic materials consisting essentially of silicon, carbon and nitrogen, said method comprising:
    pyrolyzing methylpolydisilylazane polymer represented by the general formula:

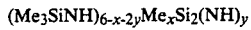

$(Me_3SiNH)_{6-x-2y}Me_xSi_2(NH)_y$ wherein the average value of x varies from 1 to 4, the average value of y varies from 1 to 2.5, and the average value of x+2y varies from 3 to 6;
    the average chloride content of said polymer being less than 0.5 weight percent.

13. Ceramic materials consisting essentially of silicon, carbon and nitrogen and prepared by the method as claimed in claim 12.

14. A method of preparing a ceramic article consisting essentially of silicon, carbon and nitrogen, said method comprising:
    (a) forming an article of the desired shape from a methylpolydisilylazane polymer represented by the general formula:

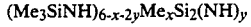

$(Me_3SiNH)_{6-x-2y}Me_xSi_2(NH)_y$ wherein the average value of x varies from 1 to 4, the average value of y varies from 1 to 2.5, and the average value of x+2y varies from 3 to 6;
    wherein the average chloride content of said polymer being less than 0.5 weight percent; and
    (b) pyrolyzing the article formed in step (a).

15. A ceramic article prepared by the method of claim 14.

16. A method of preparing a filled ceramic article consisting essentially of silicon, carbon, nitrogen and ceramic filler, said method comprising:

(a) mixing at least one ceramic filler with a methylpolydisilylazane polymer represented by the general formula:

$(Me_3SiNH)_{6-x-2y}Me_xSi_2(NH)_y$ wherein the average value of x varies from 1 to 4, the average value of y varies from 1 to 2.5, and the average value of x+2y varies from 3 to 6; the average chloride content of said polymer being less than 0.5 weight percent;

(b) forming an article of the desired shape from said mixture of ceramic filler and methylpolydisilylazane polymer; and (c) pyrolyzing the article formed in step (b).

17. A filled, ceramic article prepared by the method of claim 16.

18. A method of preparing an article coated with a ceramic, said method comprising:

(a) coating a substrate with a methylpolydisilylazane polymer represented by the general formula:

$(Me_3SiNH)_{6-x-2y}Me_xSi_2(NH)_y$ wherein the average value of x varies from 1 to 4, the average value of y varies from 1 to 2.5, and the average value of x+2y varies from 3 to 6; the average chloride content of said polymer being less than 0.5 weight percent; and (b) pyrolyzing the article formed in step (a).

19. A coated ceramic article prepared by the method of claim 18.

20. A method of preparing an article coated with a ceramic, said method comprising:

(a) mixing, with at least one conventional ceramic filler, a methylpolydisilylazane polymer represented by the general formula:

$(Me_3SiNH)_{6-x-2y}Me_xSi_2(NH)_y$ wherein the average value of x varies from 1 to 4, the average value of y varies from 1 to 2.5, and the average value of x+2y varies from 3 to 6; the average chloride content of said polymer being less than 0.5 weight percent;

(b) coating a substrate with the mixture formed in (a); and (c) pyrolyzing the article formed in step (b).

21. A coated ceramic article prepared by the method of claim 20.

22. A method of preparing a stable methylpolydisilylazane polymer incorporating a chloromonosilane substituted with a functional organic group, with reduced chloride content and without increased pyrophoricity, which method comprises the steps of:

(a) dissolving about 15 weight percent to about 80 weight percent solids of said polymer in an organic solvent;

(b) contacting the dissolved polymer with ammonia;

(c) reacting the dissolved polymer with said ammonia for about 1 to about 20 hours; and (d) recovering the reacted polymer.

23. A method as recited in claim 22 wherein:

said functional organic group is at least one of methylvinyl dichlorosilane, phenylvinyl dichlorosilane, and vinyl trichlorosilane.

24. A method of preparing a stable methylpolydisiylyazane polymer, incorporating a chloromonosilane substituted with a nonfunctional organic group, with reduced chloride content and without increased pyrophoricity, which method comprises the steps of:

(a) dissolving about 15 weight percent to about 80 weight percent solids of said polymer in an organic solvent;

(b) contacting the dissolved polymer with ammonia;

(c) reacting the dissolved polymer with said ammonia for about 1 to about 20 hours; and (d) recovering the reacted polymer.

* * * * *